US009191780B2

(12) United States Patent
Goldman (10) Patent No.: US 9,191,780 B2
(45) Date of Patent: Nov. 17, 2015

(54) CONFIGURING A WIRELESS COMMUNICATIONS DEVICE IN A MOBILE COMMUNICATIONS SYSTEM

(71) Applicant: GN Netcom A/S, Bellerup (DK)

(72) Inventor: Tomasz Jerzy Goldman, Hellerup (DK)

(73) Assignee: GN Netcom A/S (DK)

( * ) Notice: Subject to any disclaimer, the term of this patent is extended or adjusted under 35 U.S.C. 154(b) by 50 days.

(21) Appl. No.: 14/036,912

(22) Filed: Sep. 25, 2013

(65) Prior Publication Data

US 2014/0092775 A1    Apr. 3, 2014

(30) Foreign Application Priority Data

Sep. 28, 2012    (EP) .................................... 12186504

(51) Int. Cl.
*H04W 4/02*    (2009.01)
*H04W 4/00*    (2009.01)
*H04W 4/04*    (2009.01)
*H04W 8/22*    (2009.01)

(52) U.S. Cl.
CPC .............. *H04W 4/021* (2013.01); *H04W 4/001* (2013.01); *H04W 4/04* (2013.01); *H04W 8/22* (2013.01)

(58) Field of Classification Search
CPC ................................ H04W 4/021; H04W 4/16
USPC ........................................................ 370/254
See application file for complete search history.

(56) References Cited

U.S. PATENT DOCUMENTS

| | | | |
|---|---|---|---|
| 7,292,880 B2 * | 11/2007 | Lehtonen .................... 455/569.1 |
| 7,363,045 B2 * | 4/2008 | Rogalski et al. .............. 455/465 |
| 7,948,928 B2 * | 5/2011 | Rengert et al. ................. 370/315 |
| 8,116,788 B2 * | 2/2012 | Sarkissian et al. .......... 455/456.3 |
| 8,358,590 B2 * | 1/2013 | Pekarske et al. ............... 370/252 |
| 8,504,629 B2 * | 8/2013 | Winter et al. .................. 709/206 |
| 8,606,334 B2 * | 12/2013 | Goldman ................... 455/569.1 |
| 8,625,555 B2 * | 1/2014 | Ibrahim et al. ................. 370/338 |
| 2009/0063187 A1 | 3/2009 | Johnson et al. |
| 2012/0051262 A1 * | 3/2012 | Clark et al. .................... 370/254 |
| 2012/0088476 A1 * | 4/2012 | Greenfield ................. 455/414.1 |

FOREIGN PATENT DOCUMENTS

EP    2375690    10/2011

OTHER PUBLICATIONS

European Extended Search Report for European Application No. 12186504 dated Mar. 11, 2013.

* cited by examiner

*Primary Examiner* — Rasheed Gidado
(74) *Attorney, Agent, or Firm* — Altera Law Group, LLC (57) ABSTRACT

A wireless communications device (2) and an interface unit (3) in a mobile communications system are configured. The interface unit (3) is connected to the wireless communications device (2) according to a wireless communication protocol and to a computing device (1) connected to a communications network (5) via an access point (7) having an address. The computing device (1) is requested to visit a service provider (8) on the network (5), which based on the address of said access point (7) can provide location information regarding said access point (7). In dependence thereof one of a number of stored configuration profiles are determined, and the interface unit (3) is configured accordingly. A configuration request comprising said determined configuration profile is transmitted to the wireless communications device (2), which is then configured accordingly, and a communications link can be established between the interface unit (3) and the wireless communications device (2).

20 Claims, 5 Drawing Sheets

CONFIGURING A WIRELESS COMMUNICATIONS DEVICE IN A MOBILE COMMUNICATIONS SYSTEM

TECHNICAL FIELD

The invention relates to configuring a wireless communications device and an interface unit in a mobile communications system, in which a computing device is connected to a communications network.

BACKGROUND

Some wireless communication protocols use radio communication in frequency ranges that are subject to national radio frequency spectrum regulations, which means that e.g. allowed frequency bands and power levels may differ from country to country or from region to region.

One example of such a wireless communication protocol is Digital Enhanced Cordless Telecommunications (DECT) operating in the GHz range. In European countries DECT uses the original DECT frequency range of 1880-1900 MHz with ten carriers and a 250 mW peak transmit power level, while in the US DECT uses the Unlicensed Personal Communications Services (UPCS) frequency range of 1920-1930 MHz with five carriers and a 100 mW peak transmit power level. Other examples are that China uses the frequency range of 1900-1920 MHz, Latin American countries the frequency range of 1910-1930 MHz, while other countries, such as India, do not allow DECT at all.

DECT is, among other applications, used for communication between a headset and a base station or a dongle connected to a computer. The use of Unified Communications (UC), which is an integration of real time communication services such as instant messaging, presence information, telephony, video, data sharing, etc., is growing, and therefore an increase in the use of soft phone applications on personal computers (incl. Apple Mac computers) can also be expected. Such soft phone applications typically use a headset as the audio endpoint, and as mentioned above such headsets may use DECT as the wireless communication profile.

The different national/regional regulations for wireless communication protocols, such as DECT, means that manufacturers of devices using these communication protocols need to produce or configure (and keep in stock) the devices in different versions and to ensure that only the version complying with the regulations of a given country or region is delivered and sold in that country or region, because devices produced or configured to another country or region would probably not be in compliance with the local regulations.

Further, today it is common that people travel all over the world, and it would therefore often occur that a user of e.g. a DECT headset allowed in one region would carry his equipment to another region, where its use is not allowed. For instance, if a DECT headset configured for use in a European country is brought to and operated in the US, it would operate in a frequency band that is reserved for other uses in the US, and it would therefore probably interfere with other devices using that frequency band.

To solve these problems it has been suggested to adapt such devices to be configured to a configuration profile in accordance to its location.

From GB 2 436 187 it is known that a communication device can select a radio access technology in dependence of a location determined by a Global Positioning System (GPS). However, the additional cost and space requirements of integrating a GPS receiver in the device make this solution less suited for use in a headset.

US 2011/0312314 describes a system in which e.g. a DECT device scans the local environment for other DECT signals to determine if its own operating, characteristics are like or different from those in the vicinity of the device. If they are different the device modifies its operating characteristics to correspond to those used in the vicinity. However, this system assumes that devices in the vicinity are operating according to the local regulations, which might not always be the case. For instance, in an airport the devices in the vicinity of a given device could well be other devices that have just been switched on after arrival from a region with different regulations, and in that case the device would adjust to the wrong profile and start transmitting on frequencies that are not allowed in this region.

Another solution is described in US 2012/0051262, in which a mobile communication device configuration unit is adapted to detect region data from a computing device communicating with the mobile communication device and to responsively select a configuration profile from a number of configuration profiles stored in a memory. The use region may be identified using a country code identifier that is stored by the operating system of the computer. The operating system may be a Microsoft Windows™ operating system such as Windows 7™, which stores country code identifiers indicating the country of use. However, these identifiers are a part of the installation of the computer, and they are not changed when the computer is moved from one country to another. Thus the travelling problem mentioned above is not solved by this solution.

SUMMARY

Therefore, it is an object of embodiments of the invention to provide a method of configuring a wireless communications device such that compliance with different local regulations are ensured also when a device is brought from one country or region to another.

According to embodiments of the invention the object is achieved by a method of configuring a wireless communications device and an interface unit in a mobile communications system, the interface unit comprising a computer interface for connecting the interface unit to a computing device connected to a communications network via an access point having an address; a transceiver configured to exchange radio signals between the interface unit and the wireless communications device according to a wireless communication protocol; and access to a storage having stored therein a number of configuration profiles, each stored configuration profile being linked to at least one location; wherein the method comprises the steps of requesting the computing device to visit a service provider on the communications network, which based on the address of said access point can provide location information regarding said access point; determining in dependence of said location information one of said stored configuration profiles; configuring the interface unit according to said determined configuration profile; transmitting a configuration request comprising said determined configuration profile from the interface unit to the wireless communications device; configuring the wireless communications device according to said determined configuration profile; and establishing a communications link for exchanging radio signals between the interface unit and the wireless communications device according to said wireless communication protocol and said determined configuration profile.

When the location information is provided from a service provider on a communications network based on the address of the access point via which the computing device is connected to the communications network it is ensured that the location information actually indicates the true location of the wireless communications device. Thus when the wireless communications device is configured to operate according to a configuration profile that is based on this location information the device will be in compliance with the local regulations even when it has been moved from one region to another. Manufacturers of such devices now only need to produce one version of the devices for all markets, because the device is automatically configured to operate according to the regulations in the area where it is connected.

In one embodiment the communications network is the Internet, which is the most commonly used network, and in that case the access point may be an IP (Internet Protocol) access point, and the address of said access point may be an IP address.

Alternatively, the access point may be a Wi-Fi access point, and the address of said access point may be a Wi-Fi address.

In one embodiment, the method further comprises the step of transmitting the configuration request comprising the determined configuration profile from the interface unit to the wireless communications device according to said determined configuration profile. This ensures that the request is transmitted in compliance with the local regulations. Alternatively, the request may be transmitted on a serial communication channel on a wired connection when the communication device is placed in e.g. a base station.

The wireless communication protocol may be a Digital Enhanced Cordless Telecommunications (DECT) protocol.

In one embodiment, each of said configuration profiles comprises a number of parameters including at least a frequency band allowed in the at least one location linked to the configuration profile. As mentioned above, the allowed frequency bands differ from region to region.

The location information may comprise a country code, which is expedient because a country code directly identifies the configuration profile allowed in a given country.

Some embodiments of the invention also relates to an interface unit comprising a computer interface for connecting the interface unit to a computing device; a transceiver configured to exchange radio signals between the interface unit and a wireless communications device according to a wireless communication protocol; and access to a storage having stored therein a number of configuration profiles, each stored configuration profile being linked to at least one location, wherein the interface unit is further configured to obtain from said computing device information regarding the location of said computing device; determine in dependence of said obtained location information one of said stored configuration profiles; configure the interface unit according to said determined configuration profile; transmit a configuration request comprising said determined configuration profile to the wireless communications device; and establish a communications link for exchanging radio signals between the interface unit and the wireless communications device according to said wireless communication protocol and said determined configuration profile. The interface unit is further configured to request the computing device connected to a communications network via an access point having an address to visit a service provider on the communications network, which based on the address of said access point can provide location information regarding said access point, and to determine the configuration profile from the location information regarding said access point.

Embodiments corresponding to those mentioned above for the method also apply for the interface unit.

Some embodiments of the invention relate to a computer program and a computer readable medium with program code means for performing the method described above.

BRIEF DESCRIPTION OF THE DRAWINGS

Embodiments of the invention will now be described more fully below with reference to the drawings, in which.

DETAILED DESCRIPTION

Figure 1:
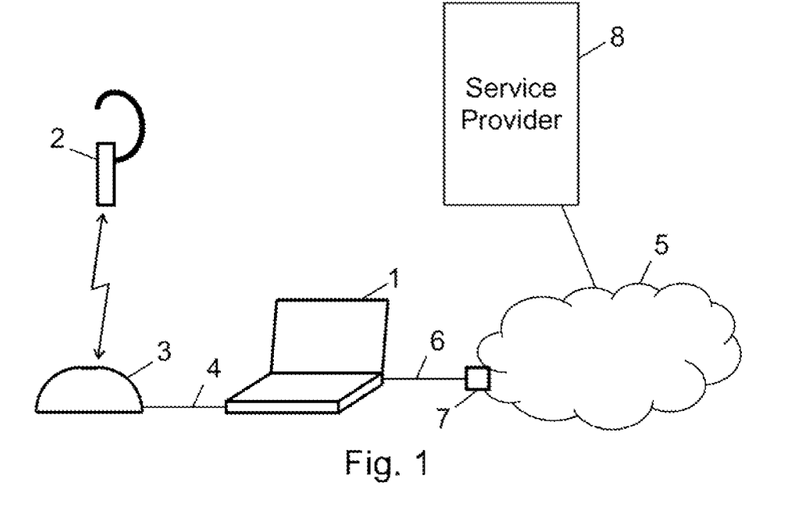
FIG. 1 shows an embodiment of a personal communications system in which a client computer is connected to a headset system with a headset and a base station and to a communications network via an access point.

FIG. 1 illustrates an example of a personal communications system in which the invention may be used. A client computer 1 is connected to a headset system 2, 3 via a connection 4, which may be connected to the client computer 1 by means of e.g. a USB interface. The headset system 2, 3 comprises a headset 2 and a base station, base unit or interface unit 3. In the figure, the headset system is shown in an active state in which the headset 2 has been moved away from the base station 3, and a wireless connection has been established between the headset 2 and the base station 3 by transmitting radio signals between them. In a passive state, the headset 2 may be placed in the base station 3. The transmitted radio signals may represent sound (speech), data or control signals. The wireless communication between the headset 2 and the base station 3 may use any of a number of different wireless communication protocols, such as Digital Enhanced Cordless Telecommunications (DECT), Bluetooth, Wireless Fidelity (WiFi), or Ultra Wideband (UWB). At present DECT seems to be the most widely used wireless communication protocol for this application, and thus in the following a DECT headset system will be used as an example. DECT uses radio communication in the GHz range and is subject to national regulations regarding e.g. radio frequency spectrum and transmission power levels.

The client computer 1 may be a notebook computer, a desktop computer, a personal digital assistant (PDA) device, a smartphone or other computer types.

The client computer 1 is also connected to a network 5 via the connection 6 and an access point 7. The network 5 may e.g. be the Internet or another communications network. In the following the Internet will be used as an example. When the network 5 is the Internet the access point 7 is correspondingly an Internet access point having an IP (Internet Protocol) address. Connected to the network 5 is also a service provider 8, which provides a web service that enables determining the geographic position of an IP access point based on the IP address of that IP access point. An example of such a service provider can be found on www.ip2location.com, but other service providers can present similar services.

Among several other applications running on the client computer 1 is a soft phone application. This application uses the headset system 2, 3 to perform telephone communications via the network 5. The client computer 1, and thus the soft phone application, communicates with the headset system 2, 3 via a USB interface and the connection 4 to the base station 3 and with the network 5 via a network interface and the connection 6. However, other types of interfaces may be used as well. As an example, wireless interfaces could be used for communication with the headset system 2, 3 and/or the network 5. The soft phone application is often used in relation to Unified Communications (UC), which is an integration of real time communication services such as instant messaging, presence information, telephony, video, data sharing, etc.

Figure 2:
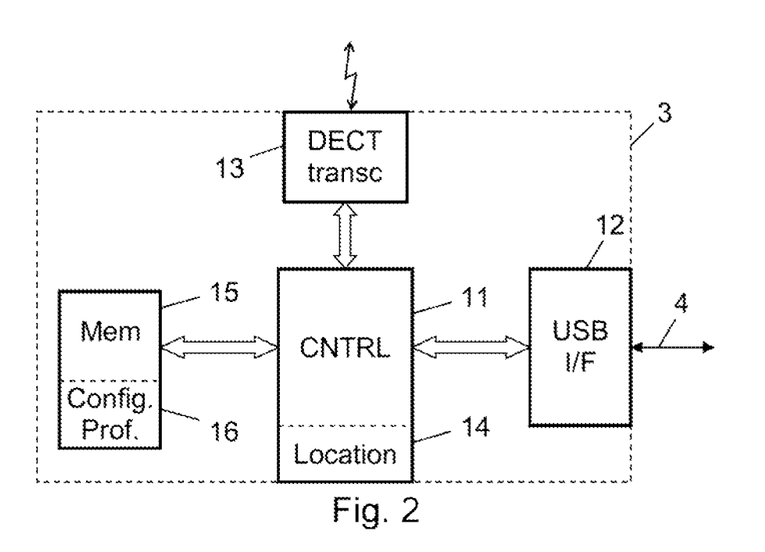
FIG. 2 shows block diagram of the headset base station of FIG. 1.

FIG. 2 shows a block diagram of the base station 3, which comprises a control unit 11 controlling the functions of the base station. The communications in and out of the base station 3 are performed through a USB interface 12 for communications with the client computer 1 and a DECT transceiver 13 for communications with the headset 2. The control unit 11 comprises a location application 14, which can instruct the client computer to visit the service provider 8 in order to obtain the geographic position of the IP access point 7, and thus the geographic position of the client computer 1, based on the IP address of the IP access point 7. When the client computer 1 in response receives the geographical position from the service provider 8, it forwards this information to the location application 14 in the base station 3.

The location application 14 is typically activated when the client computer 1 and/or the base station 3 is switched on, i.e. in order to determine the location before transmission of radio signals between the base station 3 and the headset 2 is initiated, but the application may also be run/activated at regular intervals while the base station 3 is active.

The base station 3 also comprises a memory 15, in which a table with a number of configuration profiles 16 are stored together with the geographical locations, where each configuration profile corresponds to the local regulations of a geographical location. Each configuration profile may comprise e.g. allowed radio frequency spectrum, the number of carriers used in that spectrum and transmission power levels. As examples of such configuration profiles it can be mentioned that in European countries DECT uses the original DECT frequency range of 1880-1900 MHz with ten carriers and a 250 mW peak transmit power level, while in the US DECT uses the Unlicensed Personal Communications Services (UPCS) frequency range of 1920-1930 MHz with five carriers and a 100 mW peak transmit power level. Other examples are that China uses the frequency range of 1900-1920 MHz, Latin American countries the frequency range of 1910-1930 MHz, while other countries, such as India, do not allow DECT at all. Alternatively, the memory 15 with the configuration profiles 16 may be located in the client computer 1, as long as the location application 14 has access to the memory. The memory could also be located on a server, either a local server or a server accessible via the network 5.

When the location application 14 has received a geographical position from the client computer, which received it from the service provider 8, it uses this information to look up the allowed configuration profile from the table of configuration profiles 16 in the memory 15, i.e. the configuration profile that is allowed in the geographical location in which it has now been determined that the client computer is located. The control unit 11 can then configure the DECT transceiver 13 and the headset 2 according to that configuration profile as it will be described in more detail in the following.

Figure 3:
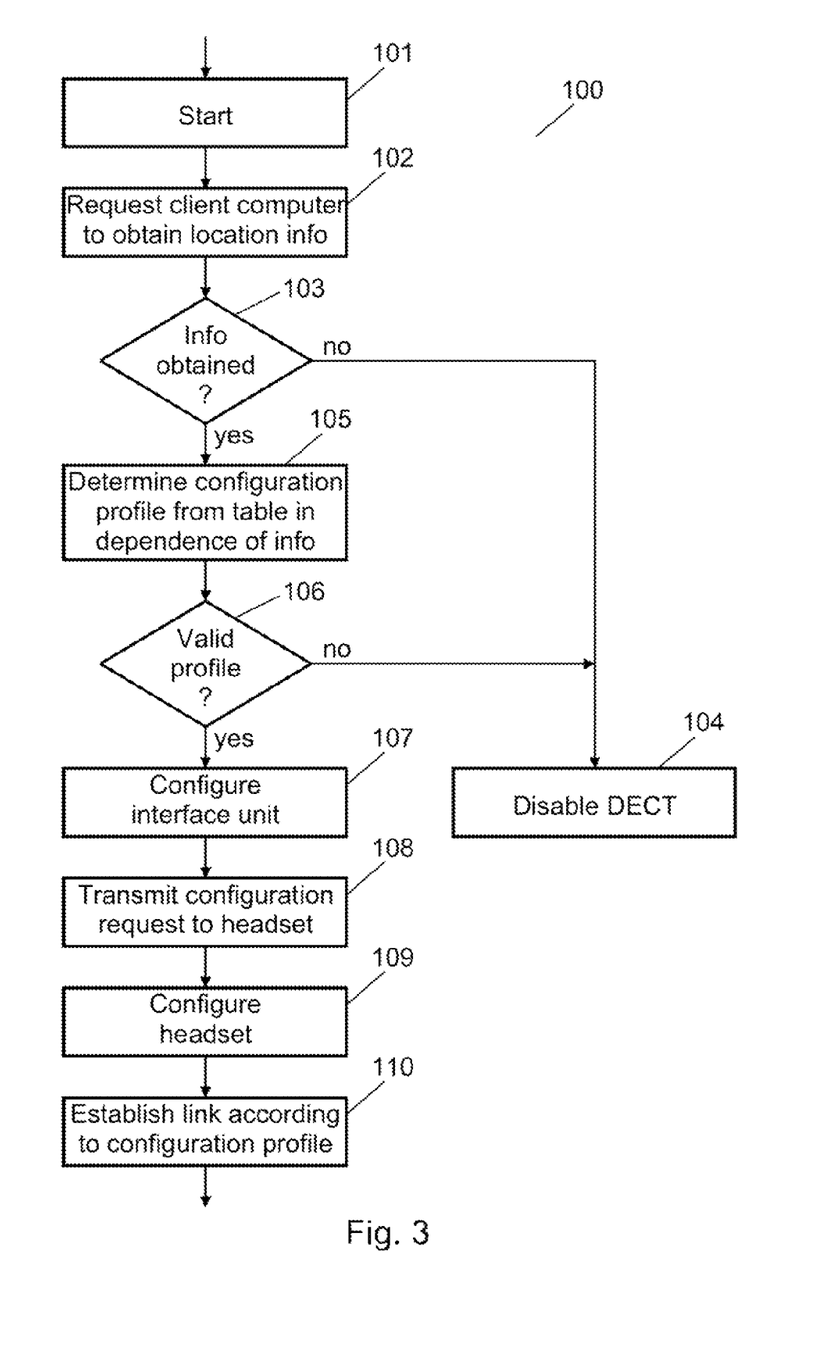
FIG. 3 shows a flow chart of a method of configuring a headset and a base station according to location information based on the address of the access point to the network.

The method of configuring the headset 2 and the base station or interface unit 3 to a configuration profile that depends on the geographical location is illustrated in the flow chart 100 shown in FIG. 3.

The method starts in step 101 when the base station is switched on, or in the case where the interface unit is placed in the client computer 1, when it is detected that a DECT unit is connected to the computer. As mentioned above, the procedure may also be activated at regular intervals during normal use of the DECT unit.

In step 102 the location application 14 requests the client computer 1 to query the location of the access point 7 by visiting the service provider 8 under use of the address of the access point. The service provider 8 will then in response return information to the client computer 1 about the geographical location of the access point 7 (including information of the country or region in which the access point is located), and the client computer 1 forwards this information to the location application 14. In case such information for some reason cannot be obtained (step 103) the user of the system can be informed accordingly and DECT can be disabled in step 104. Thus DECT transmission is not initiated unless a location and thus an allowed configuration profile is known. Alternatively, if this does not violate local regulations, it might be possible in step 104 to enter the location of the device and/or a configuration profile manually by the user.

When the location information is received by the location application 14, the application uses the information in step 105 to determine an allowed configuration profile by means of the look-up table with configuration profiles 16 stored in the memory 15. If a valid configuration profile cannot be found (step 106), e.g. because DECT is not allowed in the country where the system is located, the user of the system can be informed accordingly and DECT will be disabled in step 104.

In step 107 the control unit 11 then configures the base station 3, i.e. the DECT transceiver 13 according to the determined configuration profile. In other words, the DECT transceiver 13 is adjusted to use the allowed frequency range, power level, etc. If the interface unit is placed in the client computer 1, a configuration request is instead sent to the base station 3 via the connection 4, and the DECT transceiver 13 can then be configured accordingly.

Next, in step 108 a configuration request including the allowed configuration profile is then sent to the headset 2. This may be done using the DECT transceiver 13, which has now already been configured to use the allowed configuration profile. Alternatively, when the headset 2 is placed in its holder on the base station 3, it may be transmitted using a serial communication channel via a physical/wired connection between the base station 3 and the headset 2.

When the headset 2 has received the configuration request with the allowed configuration profile, this profile is then in step 109 used to configure the headset accordingly.

Thus when the base station as well as the headset have now both been configured according to the allowed configuration profile, a DECT communications link can now be established between them in step 110, because it has now been ensured that the transmissions are performed according to the allowed configuration profile, i.e. using the allowed frequency range, power level, etc.

Figure 4:
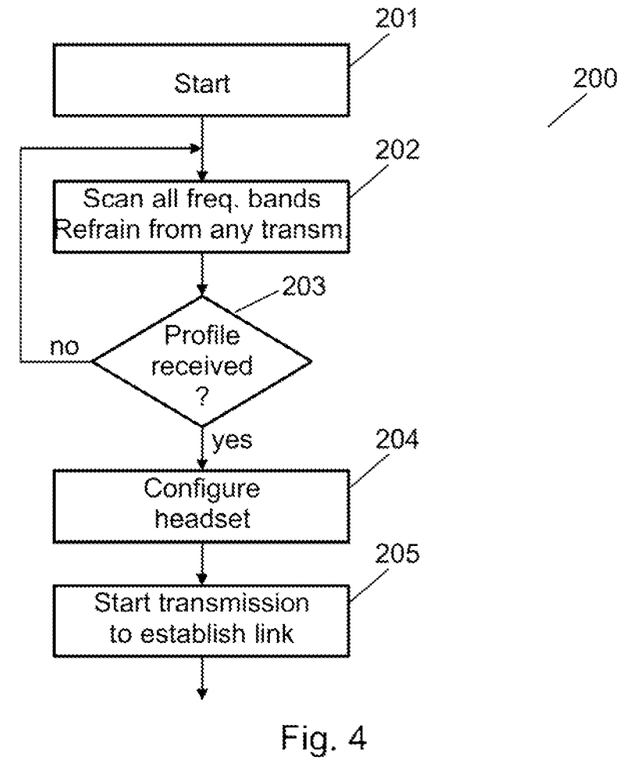
FIG. 4 shows a flow chart of the steps that can be performed in the headset before and during its configuration.

FIG. 4 shows a flow chart 200 illustrating the steps that can be performed in the headset 2 before and during its configuration to an allowed configuration profile. The procedure starts in step 201 when the headset is switched on. As soon as the headset is powered up its receiver begins scanning/listening on all different DECT frequencies, i.e. the frequency bands of the different DECT configuration profiles. During this scanning process the transmitter of the headset 2 is designed to be disabled, so that the headset refrains from transmitting any signals until a configuration request with an allowed configuration profile is received on one of the DECT frequency bands. As described above, the base station 3 is expected to send this request using the allowed configuration profile, when this profile has been determined.

When it is detected in step 203 that a configuration request with an allowed configuration profile is received, the headset, i.e. the DECT transceiver of the headset, can be configured according to the received configuration profile in step 204. After this configuration it is ensured that the headset can only transmit DECT signals according to the configuration profile that is allowed in the location/country where the system is located. Thus in step 205 the headset 2 can now safely begin to transmit DECT signals for establishing a DECT link between the headset 2 and the base station 3, which as described above is already at this stage configured accordingly.

It is noted that the headset 2 could also be a wireless handset and/or it could include the function of a speaker phone, i.e. it could be provided with a loudspeaker so that it can be used for a telephone conversation when it is placed e.g. on a table.

In the embodiment described above and shown in FIG. 1, the headset 2 is connected to the client computer 1 via the base station 3, i.e. a wireless DECT connection between the headset 2 and the base station 3 and a USB connection between the base station 3 and the client computer 1. The client computer 1 is connected to the Internet 5 via the connection 6 and the IP access point 7. A few other embodiments will be described below.

Figure 5:
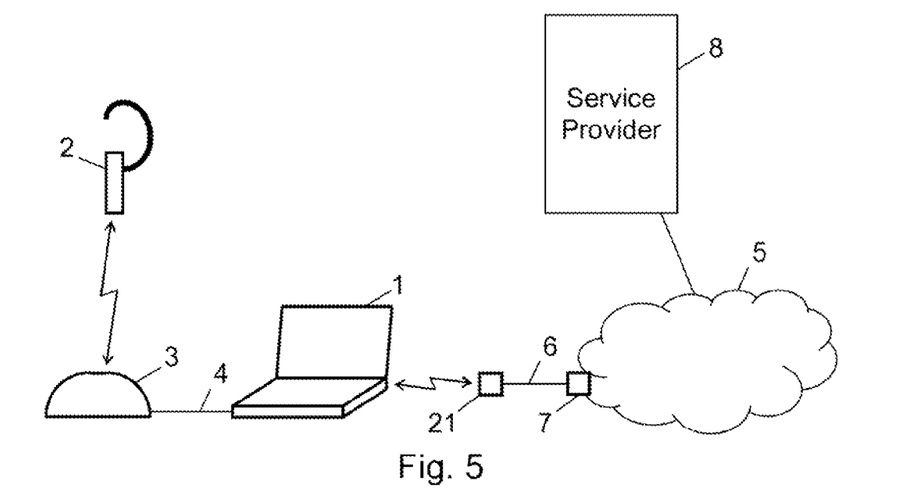
FIG. 5 shows an embodiment in which the client computer is connected to the Internet via a Wi-Fi access point.

In FIG. 5, the client computer 1 is connected to the Internet 5 via a Wireless Fidelity (Wi-Fi) access point 21. Thus there is a wireless Wi-Fi connection between the client computer 1 and the Wi-Fi access point 21, while the Wi-Fi access point 21 is connected to the Internet 5 via the connection 6 and the IP access point 7. In this case, the IP address of the IP access point 7 can be used for obtaining the location information from the service provider 8 as described above, but alternatively it is also possible to use a Wi-Fi positioning system, where a MAC address of the Wi-Fi access point 21 is used for looking up the geographic position of the Wi-Fi access point or router in a Wi-Fi positioning system (WPS) data base, such as maintained by Google, Navizon or Skyhook Wireless. In this case the service provider 8 comprises the WPS data base.

Figure 6:
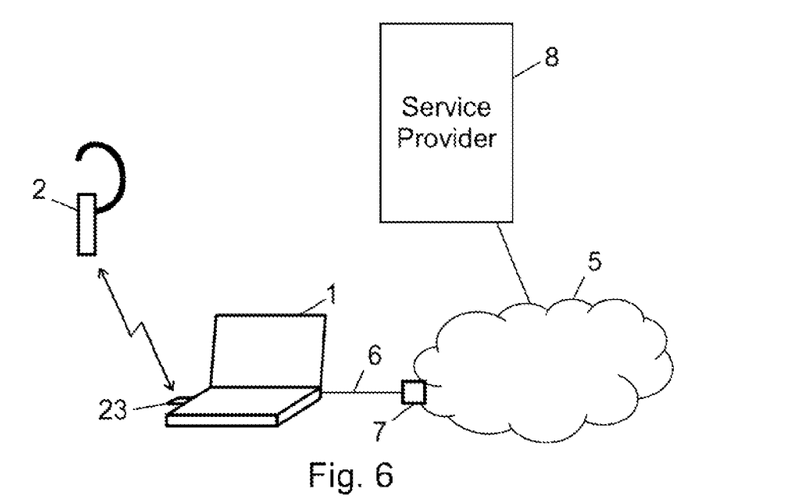
FIG. 6 shows an embodiment in which the client computer is connected to the headset via a dongle.

Another modification of the system of FIG. 1 is illustrated in FIG. 6, where the base station 3 has been replaced by a DECT dongle 23. In this case the dongle 23 is the interface unit, and the block diagram of FIG. 2 is also valid as a block diagram of the dongle 23. The configuration request of step 108 mentioned above can in this case only be transmitted to the headset 2 as a DECT signal according to the allowed configuration profile, since there is no wired connection to the headset 2. Otherwise, the system works in the same way as described above. The interface unit could also be a conferencing device or a speaker phone, i.e. a unit provided with a loudspeaker and a microphone so that it can be used for telephone conversations in situations where this is more convenient than using the headset.

Figure 7:
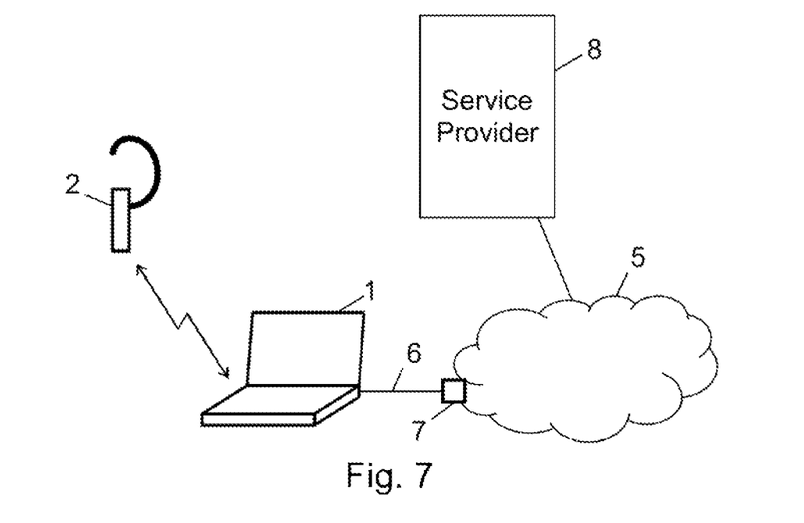
FIG. 7 shows an embodiment in which the interface unit is integrated in the client computer.

The interface unit as illustrated in FIG. 2 may also be integrated in the client computer 1 as it is illustrated in FIG. 7. In this case the USB interface 12 can of course be omitted, and the memory 15 may be a part of the general memory of the client computer 1. Otherwise, the system works in the same way as described above.

Figure 8:
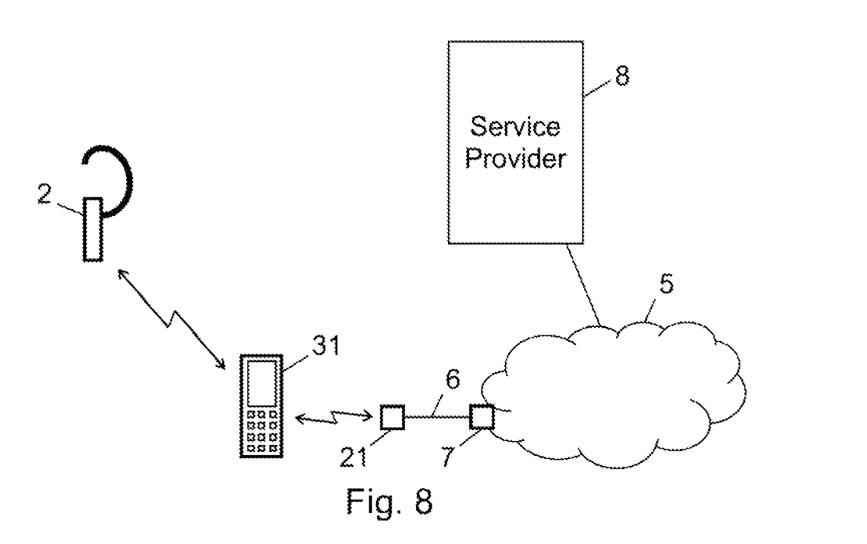
FIG. 8 shows an embodiment in which the client computer a mobile phone.

When the interface unit is integrated in the client computer 1, the client computer 1 may also be a mobile device, such as the mobile phone 31 shown in FIG. 8. The mobile phone 31 may be connected to the Internet via a Wi-Fi access point 21 similar to the one that was shown in FIG. 5. Alternatively, if the connection to the Internet is established via the normal mobile phone cellular network (e.g. using technologies such as Global System for Mobile Communication (GSM), Wideband Code Division Multiple Access (WCDMA) or Third Generation (3G) Long Term Evolution (3G LTE)), an address of the network base station to which the phone is connected may be used for obtaining the geographical location from the service provider 8.

Although various embodiments of the present invention have been described and shown, the invention is not restricted thereto, but may also be embodied in other ways within the scope of the subject-matter defined in the following claims.

The invention claimed is:

1. A wireless headset communications system, comprising:
   a wireless headset device and a base interface unit wirelessly and physical wire connectable to said headset device, the base interface unit including:
   a. a computer interface for connecting the interface unit to a computing device connected to a communications network via an access point having an address;
   b. a transceiver configured to exchange radio signals between the interface unit and the wireless headset device according to a first wireless communication protocol; and
   c. access to a storage having stored therein a number of configuration profiles, each stored configuration profile being linked to at least one location, said profiles including parameters for allowed communications protocols by geographic location;
   wherein the system performs the steps of:
   a. determining the geographical location of the base unit by having the computing device communicate with said access point to obtain an address and a correlation to a physical location;
   b. ;
   c. determining, in dependence of said geographic location information, one of said stored configuration profiles;
   d. determining if first communication protocol is allowed in that geographic location;
   e. if the first communication protocol is authorized in that geographic location, configuring the interface unit according to said stored configuration profile;
   f. transmitting a configuration request comprising said determined configuration profile from the interface unit to the wireless headset communications device;
   g. configuring the wireless communications device according to said determined configuration profile; and
   h. establishing a communications link for exchanging radio signals between the interface unit and the wireless communications device according to said wireless communication protocol and said determined configuration profile;
   i. if the first communication protocol is not allowed in that geographic location, connecting the headset device to the base unit by a physical wired connection, and transmitting a configuration request comprising said stored configuration profile from the interface unit to the wireless headset communications device via said physical wired connection, so that no wireless transmission is made in that geographic location with an unauthorized protocol.

2. The system according to claim 1, wherein the communications network is the Internet.

3. The system according to claim 2, wherein said access point is an IP access point, and the address of said access point is an IP address.

4. The system according to claim 1, wherein said access point is a Wi-Fi access point, and the address of said access point is a Wi-Fi address.

5. The system according to claim 1, wherein the method further comprises the step of transmitting the configuration request comprising the determined configuration profile from the interface unit to the wireless communications device according to said determined configuration profile.

6. The system according to claim 1, wherein said wireless communication protocol is a Digital Enhanced Cordless Telecommunications protocol.

7. The system according to claim 1, wherein each of said configuration profiles comprises a number of parameters including at least a frequency band allowed in the at least one location linked to the configuration profile.

8. The system according to claim 1, wherein said location information comprises a country code.

9. An interface unit comprising:
 a. a computer interface for connecting the interface unit to a computing device;
 b. a transceiver configured to exchange radio signals between the interface unit and a wireless communications device according to a first wireless communication protocol, and
 c. access to a storage having stored therein a plurality of configuration profiles, each stored configuration profile being linked to at least one geographic location, said profiles including parameters for allowed communications protocols by geographic location;
wherein the interface unit is further configured to:
 j. obtain from said computing device information regarding the location of said computing device;
 k. determine in dependence of said obtained location information one of said stored configuration profiles;
 l. determining if first communication protocol is authorized in that geographic location;
 m. if the first communication protocol is authorized in that geographic location, configure the interface unit according to said configuration profile;
 n. transmit a configuration request comprising said determined configuration profile to the wireless communications device; and
 o. establish a communications link for exchanging radio signals between the interface unit and the wireless communications device according to said wireless communication protocol and said determined configuration profile;
 p. if the first communication protocol is not allowed in that geographic location, connecting the headset device to the base unit by a physical wired connection, and transmitting a configuration request comprising a stored configuration profile from the interface unit to the wireless headset communications device via said physical wired connection, so that no wireless transmission is made in that geographic location with an unauthorized protocol.

10. The interface unit according to claim 9, wherein the communications network is the Internet.

11. The interface unit according to claim 10, wherein the interface unit is further configured to request the computing device to obtain said location information based on an IP address of said access point, when the computing device is connected to the Internet via an IP access point.

12. The interface unit according to claim 9, wherein the interface unit is further configured to request the computing device to obtain said location information based on a Wi-Fi address of said access point, when the computing device is connected to the communications network via a Wi-Fi access point.

13. The interface unit according to claim 9, wherein the interface unit is further configured to transmit the configuration request comprising the determined configuration profile to the wireless communications device according to said determined configuration profile.

14. The interface unit according to claim 9, wherein said wireless communication protocol is a Digital Enhanced Cordless Telecommunications protocol.

15. The interface unit according to claim 9, wherein each of said configuration profiles comprises a number of parameters including at least a frequency band allowed in the at least one location linked to the configuration profile.

16. The interface unit according to claim 9, wherein said location information comprises a country code.

17. The interface unit according to claim 9, wherein the interface unit comprises a base station for a headset.

18. The interface unit according to claim 9, wherein said computer interface is a Universal Serial Bus interface, and that the interface unit comprises a dongle configured to be removably coupled to the computing device via said Universal Serial Bus interface.

19. The interface unit according to claim 9, wherein the interface unit is an integrated part of said computing device.

20. An interface unit comprising:
 a. a base unit connectable to the internet;
 b. a communications device connectable to the base used by wireless communication and physical wired connection;
 c. a transceiver configured to exchange radio signals between the base unit and a communications device according to a first wireless communication protocol, and
 d. access to a data storage having stored therein a plurality of configuration profiles, each stored configuration profile being linked to at least one geographic location, said profiles including parameters for allowed communications protocols by geographic location;
wherein the base unit is further configured to:
 e. obtaining information regarding the geographic location of said base unit;
 f. determine in dependence of said obtained geographic location information one of said stored configuration profiles;
 g. determining if first communication protocol is allowed in that geographic location;
 h. if the first communication protocol is authorized in that geographic location, configure the interface unit according to that configuration profile;
 i. transmitting a configuration request comprising said configuration profile to the wireless communications device; and
 j. establishing a communications link for exchanging radio signals between the interface unit and the wireless communications device according to said wireless communication protocol and said determined configuration profile;
 k. if the first communication protocol is not allowed in that geographic location, connecting the headset device to the base unit by a physical wired connection, and transmitting a configuration request comprising said determined configuration profile from the interface unit to the headset communications device via said physical wired connection, so that no unauthorized wireless transmission is made in that geographic location, until the headset and base unit are configured to an allowed wireless communication protocol.

* * * * *